(12) United States Patent
Zhao et al.

(10) Patent No.: US 9,571,333 B2
(45) Date of Patent: Feb. 14, 2017

(54) NETWORK DEVICE AND METHOD FOR MAINTAINING NETWORK CONNECTION

(71) Applicant: Sercomm Corporation, Taipei (TW)

(72) Inventors: Shao-Hai Zhao, Jiangsu Province (CN); Chao Xing, Jiangsu Province (CN)

(73) Assignee: SERCOMM CORPORATION, Taipei (TW)

( * ) Notice: Subject to any disclaimer, the term of this patent is extended or adjusted under 35 U.S.C. 154(b) by 174 days.

(21) Appl. No.: 14/592,928

(22) Filed: Jan. 9, 2015

(65) Prior Publication Data

US 2015/0236892 A1 Aug. 20, 2015

(30) Foreign Application Priority Data

Feb. 20, 2014 (CN) .......................... 2014 1 0057179

(51) Int. Cl.
*H04L 12/24* (2006.01)
*H04L 12/26* (2006.01)

(52) U.S. Cl.
CPC ........... *H04L 41/06* (2013.01); *H04L 43/0811* (2013.01); *H04L 43/106* (2013.01); *H04L 41/0672* (2013.01)

(58) Field of Classification Search
CPC ............................ H04L 41/06; H04L 43/0811
USPC .......................... 709/212, 218, 223, 224, 231
See application file for complete search history.

(56) References Cited

U.S. PATENT DOCUMENTS

| 9,100,246 | B1 * | 8/2015 | TeNgaio | ........... H04L 29/08099 |
| 2012/0060052 | A1 * | 3/2012 | White | ................. G06F 11/2025 714/6.3 |
| 2013/0039240 | A1 * | 2/2013 | Kao | .................. H04W 52/0219 370/311 |

(Continued)

FOREIGN PATENT DOCUMENTS

| CN | 201260183 Y | 6/2009 |
| CN | 103516685 A | 1/2014 |

OTHER PUBLICATIONS

"Dedicated Application Layer"—Dr. H. Ziegler, M-Bus, Feb. 2001 http://www.m-bus.com/files/w4b21021.pdf.*

(Continued)

*Primary Examiner* — Randy Scott
(74) *Attorney, Agent, or Firm* — McClure, Qualey & Rodack, LLP

(57) ABSTRACT

A method for maintaining network connection of a network device includes the following steps. Firstly, a step (a) is performed to determine whether a connection status between the network device and a remote device is disconnected. An application layer is automatically restarted if the connection status is determined to be disconnected. Then, a step (b) is performed to determine whether the connection status is still disconnected after the application layer is automatically restarted. If the connection status is still disconnected after the application layer is automatically restarted, a network protocol layer is automatically restarted. Then, a step (c) is performed to determine whether the connection status is still disconnected after the network protocol layer is automatically restarted. If the connection status is still disconnected after the network protocol layer is automatically restarted, the network device is automatically rebooted.

12 Claims, 2 Drawing Sheets

(56) References Cited

U.S. PATENT DOCUMENTS

2013/0151653 A1* 6/2013 Sawicki ............ G06F 15/17331
709/216

OTHER PUBLICATIONS

SIPO Office Action dated Jul. 14, 2016 in corresponding Chinese application (No. 201410057179.4).

* cited by examiner

NETWORK DEVICE AND METHOD FOR MAINTAINING NETWORK CONNECTION

This application claims the benefit of People's Republic of China Application Serial No. 201410057179.4, filed Feb. 20, 2014, the subject matter of which is incorporated herein by reference.

TECHNICAL FIELD

The present invention relates to a network device, and more particularly to a network device and method for maintaining network connection.

DESCRIPTION OF THE RELATED ART

With the popularization of the networking technologies, various network devices provide remote operating functions. For example, an IP camera can provide a remote surveillance monitoring function. The images captured by the IP camera are transmitted to a remote device through a network. If the connection status between the IP camera and the remote device is not normal, the images from the IP camera cannot be accurately received by the remote device.

Conventionally, if the connection status is abnormal, a troubleshooting operation has to be performed manually. That is, the network connection can only be restored to the normal status after the abnormal conditions are checked and solved by a technician.

SUMMARY

The present disclosure provides a network device and a method for maintaining network connection of the network device in order to overcome the drawbacks of the relevant technology.

An embodiment of the present disclosure provides a method for maintaining network connection of a network device. The method includes the following steps. Firstly, the network device determines whether a connection status between the network device and a remote device is disconnected. If the connection status is disconnected, the network device automatically restarts an application layer. Then, the network device determines whether the connection status is still disconnected after the network device automatically restarts the application layer. The network device automatically restarts a network protocol layer if the connection status is still disconnected. Then, the network device determines whether the connection status is still disconnected after the network protocol layer is automatically restarted. Then, the network device automatically reboots itself if the connection status is still disconnected after the network protocol layer is automatically restarted.

Another embodiment of the present disclosure provides a network device. The network device includes a network module and a controller. The network module is in communication with a remote device. The controller is electrically connected with the network module. If the controller determines that a connection status between the network module and the remote device is disconnected, the controller automatically restarts an application layer. If the controller determines that the connection status is still disconnected after the application layer is automatically restarted, the controller automatically restarts a network protocol layer. If the controller determines that the connection status is still disconnected after the network protocol layer is automatically restarted, the controller automatically reboots the network device.

Numerous objects, features and advantages of the present disclosure will be readily apparent upon a reading of the following detailed description of embodiments of the present disclosure when taken in conjunction with the accompanying drawings. However, the drawings employed herein are for the purpose of descriptions and should not be regarded as limiting.

BRIEF DESCRIPTION OF THE DRAWINGS

The above objects and advantages of the present disclosure will become more readily apparent to those ordinarily skilled in the art after reviewing the following detailed description and accompanying drawings, in which.

DETAILED DESCRIPTION OF EMBODIMENTS

The operating principles of the present disclosure will be illustrated in more details as follows.

Figure 1:
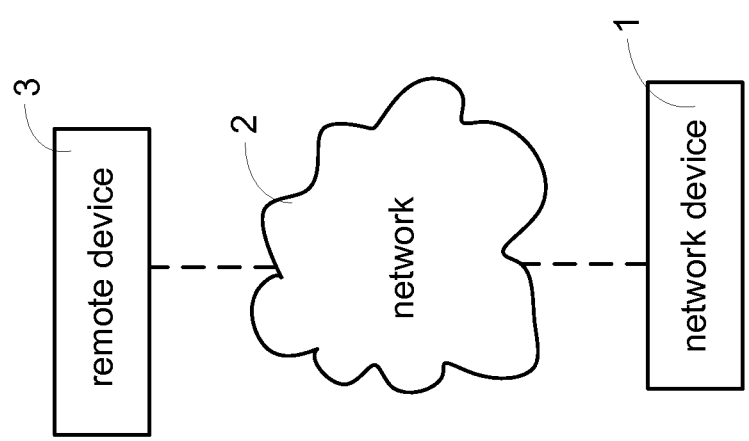
FIG. 1 schematically illustrates the connection between a network device and a remote device.

FIG. 1 schematically illustrates the connection between a network device and a remote device. In this context, one of the network device and the remote device is a first electronic device connected to a network, and the other one of the network device and the remote device is a second electronic device that is in communication with the first electronic device through the network. For example, the first electronic device is an IP camera, and the second electronic device is a cloud server.

As shown in FIG. 1, the network device 1 and the remote device 3 are in communication with each other through the network 2. An example of the network 2 includes but is not limited to a wireless network, a wired network or a combination thereof. For enhancing the networking service, the network 2 may further include one or several intermediate devices. For example, the intermediate devices may include an access point (hereinafter, AP).

The connection between the network device 1 and the remote device 3 may be disconnected because of the problems related to the network device 1, the remote device 3 and/or the network 2. For example, if a controller, the memory consumption status or the service application program of the network device 1 does not normally operate, the connection status between the network device 1 and the remote device 3 may be disconnected. Generally, the factors causing the disconnection can be easily eliminated by the internal management of the network device 1.

On the other hand, if the connection between the network device 1 and the remote device 3 is disconnected because of the problems related to the network 2 or the remote device 3, the network device 1 cannot normally operate. After the problems of the network 2 or the remote device 3 are solved, the network device 1 still cannot automatically restore to the normal status if it does not try to restore connection.

Therefore, there is a need of providing a method for maintaining network connection of the network device 1. By this method, the connection status can be automatically restored after disconnection. That is, the method of the present disclosure is capable of automatically restoring the connection status between the network device 1 and the remote device 3 if the connection status between the network device 1 and the remote device 3 is disconnected because of the influences of the network device 1. Moreover, after the problems of the network 2 or the remote device 3 are solved, the method of the present disclosure may allow the network device 1 to automatically restore the connection between the network device 1 and the remote device 3.

In accordance with the method of the present disclosure, the network device 1 is correspondingly controlled according to the result of determining the connection status. The approach of determining the connection status is not restricted. For example, the network connection status may be determined according to frequency and/or the period of receiving timestamps. Timestamps are time related information transmitted from the remote device 3 to the network device 1. The time related information may be contained in other types of data. In case that the network device 1 regularly receives the timestamps from the remote device 3 through the network 2, the connection status between the network device 1 and the remote device 3 is determined to be normal (connected).

In an embodiment, the network device 1 may continuously and periodically transmit a timestamp request in each default polling cycle. The timestamp request may be in the form of a network packet. After receiving the timestamp request, the remote device 3 correspondingly transmits the timestamp to the network 2. The network device 1 can successfully receives the timestamp if the connection status of the network 2 is normal (connected). Whereas, the network device 1 cannot receive the timestamp if the connection status of the network 2 is abnormal (disconnected).

Figure 2:
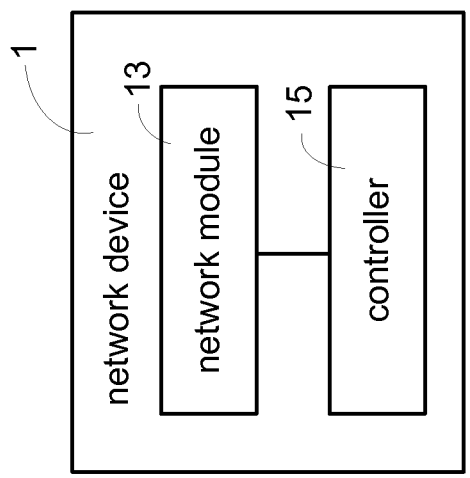
FIG. 2 is a schematic block diagram illustrating a network device according to an embodiment of the present disclosure.

FIG. 2 is a schematic block diagram illustrating a network device according to an embodiment of the present disclosure. For example, the network device 1 is an IP camera. The network device 1 includes a network module 13 and a controller 15. The network module 13 and the controller 15 are electrically connected with each other. The network module 13 of the network device 1 may be in communication with the remote device 3 through the network 2. The network module 13 includes an application layer and a network protocol layer (for example, a TCP/IP layer or a POP layer). The application layer is associated with the operations of the internal components of the network module 13. The network device 1 exchanges data with the network 2 via the network protocol layer.

As mentioned above, the connection status between the network device 1 and the remote device 3 may be ascertained by determining whether the network device 1 regularly receives the timestamps. Optionally, the network device 1 further includes a storage module (not shown). After the network module 13 receives the timestamp from the remote device 3, the controller 15 stores the timestamp into the storage module. According to the timestamp stored in the storage module, the controller 15 may determine whether the frequency and/or the period of receiving the timestamps is normal. If the frequency and/or the period of receiving the timestamps is not normal, the controller 15 may determine the connection status is disconnected and control the network module 13 to implement the method of FIG. 3.

Figure 3:
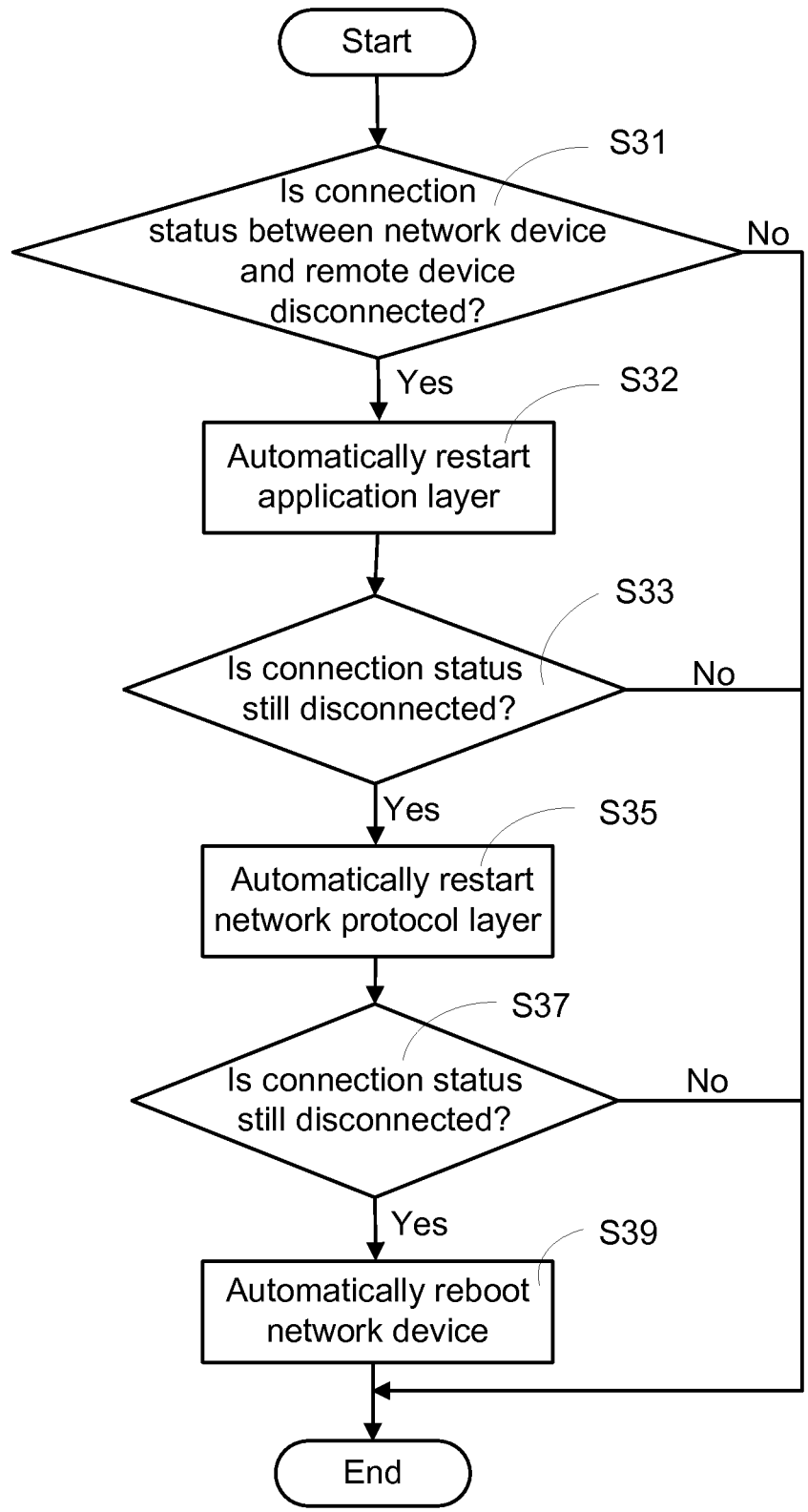
FIG. 3 is a flowchart illustrating a method for maintaining connection status between the network device and the remote device according to an embodiment of the present disclosure.

FIG. 3 is a flowchart illustrating a method for maintaining network connection status between the network device and the remote device according to an embodiment of the present disclosure. Firstly, the network device 1 determines whether a connection status between the network device 1 and the remote device 3 is disconnected (Step S31). In an embodiment, the connection status is determined according to the frequency and/or the period of receiving timestamps. Consequently, the step S31 may include the following steps. That is, the controller 15 counts a waiting time that the network module 13 receives no timestamp from the remote device 3. If the waiting time is longer than a predetermined time threshold, the controller 15 determines that the connection status is disconnected. If the connection status is determined to be connected, the flowchart terminates.

On the other hand, if the connection status is determined to be disconnected, the network device 1 or the controller 15 automatically restarts the application layer of the network device 1 (Step S32). After the application layer is automatically restarted, the controller 15 determines again whether the connection status between the network device 1 and the remote device 3 is disconnected (Step S33). If the controller 15 determines that the connection status is connected, it means that the network connection problem is eliminated. Meanwhile, the flowchart is ended.

The step S33 may include the following steps. After the network device 1 or the controller 15 automatically restarts the application layer, the network device 1 issues again the timestamp request. If the network device 1 successfully receives a timestamp in response to the timestamp request, the controller 15 determines that the connection status is connected. Whereas, if the network device 1 does not receive any timestamp in response to the timestamp request within a predetermined time threshold, the controller 15 determines that the connection status is disconnected.

If the determining result of the step S33 indicates that the connection status is still disconnected, the network device 1 or the controller 15 automatically restarts the network protocol layer of the network device 1 (Step S35), and then the controller 15 determines whether the connection status is still disconnected (Step S37). If the determining result of the step S37 indicates that the connection status is connected, the flowchart ends. Whereas, if the determining result of the step S37 indicates that the connection status is still disconnected, the network device 1 or the controller 15 automatically reboots the network device 1 (Step S39).

The step S37 may include the following steps. After the network protocol layer is automatically restarted, the network module 13 again issues the timestamp request. If the network module 13 successfully receives a timestamp in response to the timestamp request, the controller 15 determines that the connection status connected. Whereas, if the network module 13 does not receive any timestamp in response to the timestamp request within a predetermined time threshold, the controller 15 determines that the connection status is still disconnected. Consequently, the network device 1 will automatically reboot itself (Step S39).

In case that the method of the present disclosure is applied to an IP camera, the troubleshooting operation on the network can be automatically performed. The way of automatically performing the troubleshooting operation is time-saving and simplified. Consequently, the utilization efficacy of the network device 1 is enhanced. Of course, the method of the present disclosure can be applied to any other appropriate network devices.

Generally, the IP camera or other network device is not equipped with a user operation interface. Conventionally, if the IP camera encounters a trouble, the network administrator has to remotely perform the troubleshooting operation. By the method of the present disclosure, the tasks of performing the troubleshooting operations by the network administrator will be largely reduced.

While the disclosure has been described in terms of what is presently considered to be the most practical embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for maintaining network connection of a network device, the method comprising steps of:
    (a) determining whether a connection status between the network device and a remote device is disconnected, wherein an application layer is automatically restarted if the connection status is disconnected;
    (b) automatically restarting a network protocol layer if the connection status is still disconnected after the application layer is automatically restarted; and
    (c) automatically rebooting the network device if the connection status is still disconnected after the network protocol layer is automatically restarted.

2. The method of claim 1, wherein the step (a) comprises sub-steps of:
    counting a waiting time representing that the network device receives no timestamp from the remote device; and
    determining that the connection status is disconnected if the waiting time is longer than a predetermined time threshold.

3. The method of claim 2, further comprising steps of:
    issuing a timestamp request to the remote device in each polling cycle; and
    receiving a timestamp from the remote device wherein the remote device generates the timestamp in response to the timestamp request.

4. The method of claim 1, wherein the step (b) comprises sub-steps of:
    issuing a timestamp request to the remote device;
    determining that the connection status is connected if the network device receives a timestamp from the remote device in response to the timestamp request; and
    determining that the connection status is still disconnected and automatically restarting the network protocol layer if the network device does not receive the timestamp from the remote device within a predetermined time threshold.

5. The method of claim 1, wherein the step (c) comprises steps of:
    issuing a timestamp request from the network device;
    determining that the connection status is connected if the network device receives a timestamp from the remote device in response to the timestamp request; and
    determining that the connection status is still disconnected if the network device does not receive the timestamp from the remote device within a predetermined time threshold.

6. The method of claim 1, wherein the network device is an IP camera.

7. A network device, comprising:
    a network circuit for communicating with a remote device; and
    a control circuit electrically connected with the network circuit, configured to
    automatically restart an application layer if the control circuit determines that a connection status between the network circuit and the remote device is disconnected;
    automatically restart a network protocol layer if the connection status is still disconnected after the application layer is automatically restarted; and
    automatically reboot the network device if the connection status is still disconnected after the network protocol layer is automatically restarted.

8. The network device of claim 7, wherein the control circuit further counts a waiting time that the network circuit receives no timestamp from the remote device, wherein the control circuit determines that the connection status is disconnected and restarts the application layer if the waiting time is longer than a predetermined time threshold.

9. The network device of claim 8, wherein the control circuit further controls the network circuit to transmit a first timestamp request in each polling cycle, wherein the network device receives a first timestamp from the remote device in response to the first timestamp request.

10. The network device of claim 9, wherein after the application layer is automatically restarted, the control circuit further controls the network circuit to transmit a second timestamp request, wherein the control circuit determines that the connection status is connected if the network circuit receives a second timestamp from the remote device in response to the second timestamp request, wherein the control circuit determines that the connection status is still disconnected and restarts the network protocol layer if the network circuit does not receive the second timestamp from the remote device within the predetermined time threshold.

11. The network device of claim 7, wherein the control circuit further controls the network circuit to transmit a third timestamp request after the control circuit automatically restarts the network protocol layer, wherein the control circuit determines that the connection status is connected if the network circuit receives a third timestamp from the remote device in response to the third timestamp request, wherein the control circuit determines that the connection status is still disconnected and reboots the network device if the network circuit does not receive the third timestamp from the remote device within a predetermined time threshold.

12. The network device of claim 7, wherein the network device is an IP camera.

* * * * *